(12) United States Patent
Inoue et al.

(10) Patent No.: US 12,500,285 B2
(45) Date of Patent: Dec. 16, 2025

(54) POWER STORAGE DEVICE COMPRISING COMPRESSIBLE COOLER PLATE

(71) Applicant: TOYOTA JIDOSHA KABUSHIKI KAISHA, Toyota (JP)

(72) Inventors: Shigeyuki Inoue, Toyota (JP); Shinichiro Mori, Okazaki (JP); Kazunari Hiromori, Miyoshi (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 710 days.

(21) Appl. No.: 17/950,566

(22) Filed: Sep. 22, 2022

(65) Prior Publication Data
US 2023/0095791 A1   Mar. 30, 2023

(30) Foreign Application Priority Data

Sep. 24, 2021 (JP) ................................ 2021-155383

(51) Int. Cl.
| | |
|---|---|
| *H01M 10/655* | (2014.01) |
| *H01M 10/613* | (2014.01) |
| *H01M 50/262* | (2021.01) |
| *H01M 10/625* | (2014.01) |

(52) U.S. Cl.
CPC ....... *H01M 10/655* (2015.04); *H01M 10/613* (2015.04); *H01M 50/262* (2021.01); *H01M 10/625* (2015.04); *H01M 2220/20* (2013.01)

(58) Field of Classification Search
CPC ..................... H01M 10/655; H01M 10/613
See application file for complete search history.

(56) References Cited

U.S. PATENT DOCUMENTS

2018/0287227 A1* 10/2018 Jeong ................... B60L 58/25
2019/0221904 A1   7/2019 Fujii

FOREIGN PATENT DOCUMENTS

| EP | 3392955 A1 | 10/2018 |
|---|---|---|
| JP | 2014-504440 A | 2/2014 |
| JP | 2018-181694 A | 11/2018 |
| JP | 2018-181749 A | 11/2018 |
| JP | 2019-125449 A | 7/2019 |
| WO | 2012/088050 A1 | 6/2012 |

* cited by examiner

*Primary Examiner* — Maria Laios
*Assistant Examiner* — Jordan E Berresford
(74) *Attorney, Agent, or Firm* — Dinsmore & Shohl LLP

(57) ABSTRACT

A power storage device includes a lower case having a bottom portion including an inner surface and an outer surface, one or more power storage modules thermally connected to the inner surface of the bottom portion, and a cooler that is provided on a side of the outer surface of the bottom portion and cools the one or more power storage modules via the bottom portion. The cooler is made of a member having a rigidity lower than that of the lower case. The cooler includes a force exerting portion that exerts a force toward the bottom portion.

6 Claims, 7 Drawing Sheets

POWER STORAGE DEVICE COMPRISING COMPRESSIBLE COOLER PLATE

CROSS REFERENCE TO RELATED APPLICATIONS

This nonprovisional application claims priority to Japanese Patent Application No. 2021-155383 filed on Sep. 24, 2021 with the Japan Patent Office, the entire contents of which are hereby incorporated by reference.

BACKGROUND

Field

The present disclosure relates to a power storage device mounted on a vehicle.

Description of the Background Art

As a conventional power storage device, Japanese Patent Laying-Open No. 2019-125449 discloses a configuration in which a power storage stack, a heat transfer member, and a cooler abut in this order and are housed within a housing case.

SUMMARY

In recent years, as power storage devices have higher capacities, coolers for cooling power storage stacks also have larger sizes. A configuration in which a cooler is disposed outside a housing case instead of housing the cooler within the housing case has been considered. In such a case, it is conceivable to bring the cooler into thermal contact with an outer surface of a lower case. Depending on the difference in material between the cooler and the lower case, it is difficult to bring the cooler into close contact with the lower case so as to conform thereto.

The present disclosure has been made in view of the aforementioned problem, and an object of the present disclosure is to provide a power storage device that allows a cooler to be brought into close contact with an outer surface of a lower case so as to conform thereto.

A power storage device based on the present disclosure includes a lower case having a bottom portion including an inner surface and an outer surface, one or more power storage modules thermally connected to the inner surface of the bottom portion, and a cooler that is provided on a side of the outer surface of the bottom portion and cools the one or more power storage modules via the bottom portion. The cooler is made of a member having a rigidity lower than that of the lower case. The cooler includes a force exerting portion that exerts a force toward the bottom portion.

According to the configuration described above, even when the cooler is made of a member having a rigidity lower than that of the lower case, the cooler is pressed toward the bottom portion by the force exerting portion, and thus the cooler can be brought into close contact with the outer surface of the lower case so as to conform thereto.

In the power storage device based on the present disclosure, the cooler may include one or more cooling portions that cool the one or more power storage modules, a holding portion that holds the one or more cooling portions, and a fastening piece portion that projects outward from the holding portion and is fastened to the outer surface of the bottom portion. In some embodiments, the fastening piece portion includes a root portion connected to the holding portion, and the root portion is provided with a notch portion. In this case, the force exerting portion may be constituted by the fastening piece portion.

According to the configuration described above, by providing the notch portion in the root portion of the fastening piece portion connected to the holding portion, the fastening piece portion is deformed and acts as a spring structure when the fastening piece portion is fastened to the lower case. Thus, the cooler can be brought into close contact with the outer surface of the lower case so as to conform thereto.

In the power storage device based on the present disclosure, each of the power storage modules may include a first power storage stack and a second power storage stack disposed side by side in a first direction. Each of the first power storage stack and the second power storage stack may include a plurality of power storage cells arranged in a second direction crossing the first direction. Further, each of the cooling portions may include a first module cooling portion disposed below the bottom portion to sandwich the bottom portion between the first module cooling portion and the first power storage stack, and a second module cooling portion disposed below the bottom portion to sandwich the bottom portion between the second module cooling portion and the second power storage stack. Each of the first module cooling portion and the second module cooling portion extends along the second direction and has a first end portion and a second end portion in the second direction. In this case, the holding portion may include a first holding portion that extends along the first direction and holds the first end portions of the first module cooling portion and the second module cooling portion, and a second holding portion that extends along the first direction and holds the second end portions of the first module cooling portion and the second module cooling portion. Further, the fastening piece portion may include a first fastening piece portion that projects from the first holding portion at a portion located between the first module cooling portion and the second module cooling portion in the first direction, outward along the second direction, and a second fastening piece portion that projects from the second holding portion at a portion located between the first module cooling portion and the second module cooling portion in the first direction, outward along the second direction.

According to the configuration described above, by providing the first fastening piece portion and the second fastening piece portion to project outward from the first holding portion and the second holding portion at the portions located between the first module cooling portion and the second module cooling portion, the action of the first fastening piece portion and the second fastening piece portion as spring structures can be enhanced. Further, when compared with a configuration in which fastening piece portions are provided on both sides of each module cooling portion, the number of fastening piece portions can be reduced, and weight reduction can also be achieved.

The power storage device based on the present disclosure may include a panel that covers the cooler from a lower side of the cooler, and a damper member. Further, each of the one or more power storage modules may include a first power storage stack and a second power storage stack disposed side by side in a first direction. Each of the one or more cooling portions may include a first module cooling portion disposed below the bottom portion to sandwich the bottom portion between the first module cooling portion and the first power storage stack, and a second module cooling portion disposed below the bottom portion to sandwich the bottom portion between the second module cooling portion and the second power storage stack. The cooler may include a connecting piece portion that connects the first module cooling portion and the second module cooling portion. In some embodiments, the damper member is provided to be sandwiched between the connecting piece portion and the panel. In this case, the force exerting portion may be constituted by the damper member.

According to the configuration described above, the cooler can be brought into closer contact toward a bottom surface side of lower case, by a reaction force of the damper member.

The power storage device based on the present disclosure may include a panel that covers the cooler from a lower side of the cooler. Further, the one or more power storage modules may include a plurality of power storage modules disposed side by side in a first direction. Furthermore, the one or more cooling portions may include a plurality of cooling portions disposed side by side to be spaced in the first direction to correspond to the plurality of power storage modules. The cooler may include a reinforcing piece portion that connects the cooling portions adjacent to each other. In some embodiments, the reinforcing piece portion is provided to be sandwiched between the bottom portion and the panel. In this case, the force exerting portion may be constituted by the reinforcing piece portion.

According to the configuration described above, by sandwiching the reinforcing piece portion between the bottom portion and the panel, deformation of the reinforcing piece portion can bring the cooler into close contact with the bottom portion so as to conform thereto.

The power storage device based on the present disclosure may include a panel that covers the cooler from a lower side of the cooler. Further, the cooler may include one or more cooling portions that cool the one or more power storage modules, a holding portion that holds the one or more cooling portions, and a projecting piece portion that projects outward from the holding portion. In some embodiments, the projecting piece portion is provided to be sandwiched between the bottom portion and the panel. In this case, the force exerting portion may be constituted by the projecting piece portion.

According to the configuration described above, by sandwiching the projecting piece portion between the bottom portion and the panel, deformation of the projecting piece portion can bring the cooler into close contact with the bottom portion so as to conform thereto.

The foregoing and other objects, features, aspects and advantages of the present disclosure will become more apparent from the following detailed description of the present disclosure when taken in conjunction with the accompanying drawings.

DETAILED DESCRIPTION

Figure 1:
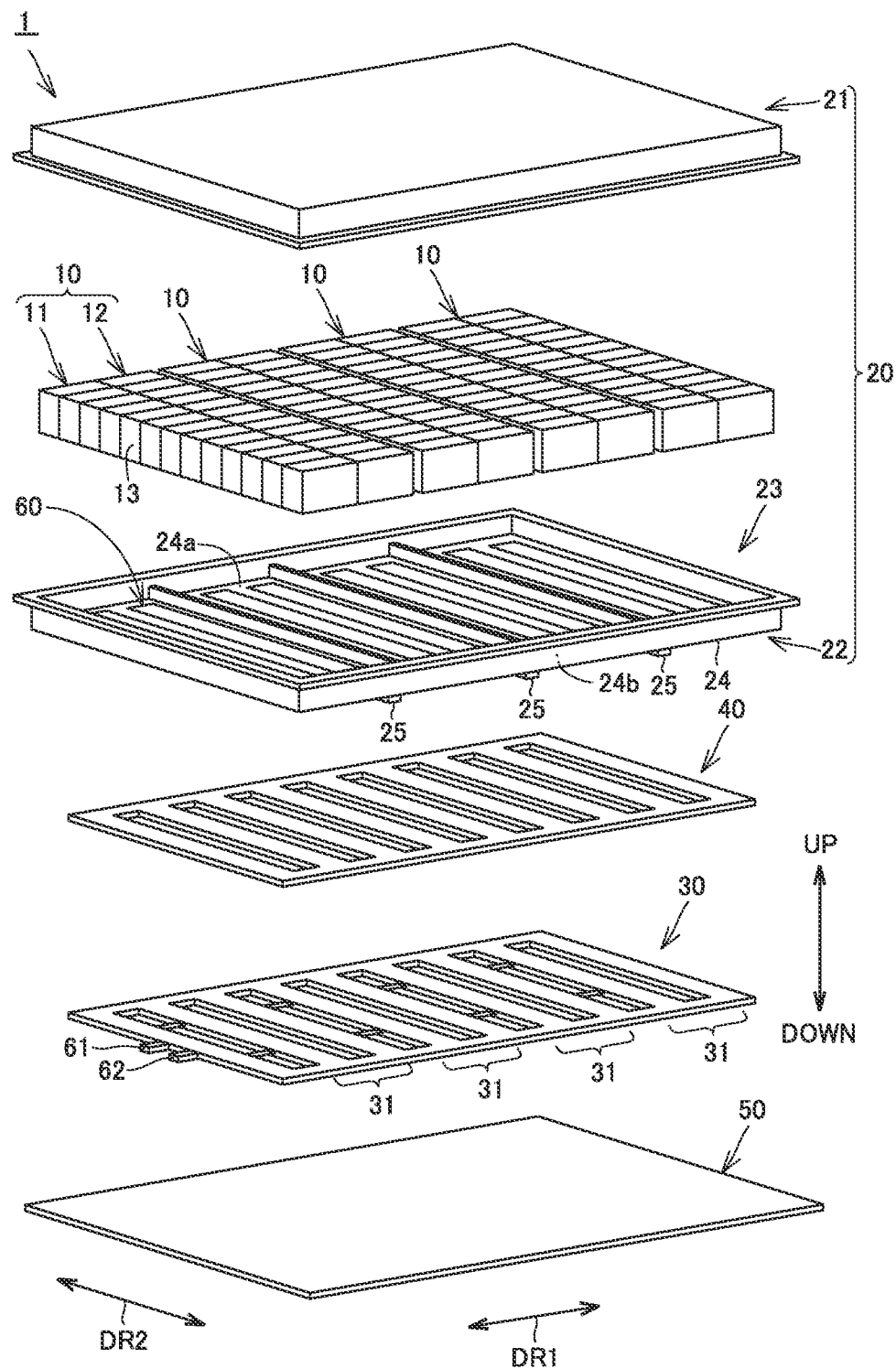
FIG. 1 is an exploded perspective view of a power storage device in accordance with an embodiment.

Hereinafter, an embodiment of the present disclosure will be described in detail with reference to the drawings. It should be noted that, in the embodiment described below, identical or common parts will be designated by the same reference numerals in the drawings, and the description thereof will not be repeated.

FIG. 1 is an exploded perspective view of a power storage device in accordance with an embodiment. Referring to FIG. 1, a power storage device 1 in accordance with a first embodiment will be described.

Power storage device 1 in accordance with the embodiment is mounted on a hybrid vehicle that can run using motive power of at least one of a motor and an engine, or an electrically powered vehicle that runs using a driving force obtained by electrical energy.

As shown in FIG. 1, power storage device 1 in accordance with the first embodiment includes a plurality of power storage modules 10, a housing case 20, a cooler 30, a heat conduction member 40, a share panel 50, and an inner heat conduction layer 60.

The plurality of power storage modules 10 are disposed side by side to be spaced in a first direction (a DR1 direction). Each of the plurality of power storage modules 10 includes a first power storage stack 11 and a second power storage stack 12 disposed side by side in the first direction. It should be noted that, in a mounted state where power storage device 1 is mounted on the vehicle, the first direction is parallel to a front-rear direction of the vehicle, for example.

Each of first power storage stack 11 and second power storage stack 12 includes a plurality of power storage cells 13 arranged in a second direction (a DR2 direction) crossing the first direction. The second direction is perpendicular to the first direction, and in the mounted state, is parallel to a right-left direction of the vehicle, for example.

Each power storage cell 13 is, for example, a secondary battery such as a nickel-hydrogen battery or a lithium ion battery. Power storage cell 13 has a rectangular shape, for example. Power storage cell 13 may be a power storage cell using a liquid electrolyte, or a power storage cell using a solid electrolyte. Further, power storage cell 13 may be a unit capacitor configured to store power.

Housing case 20 houses the plurality of power storage modules 10. Housing case 20 includes an upper case 21 and a lower case 22.

Upper case 21 has a substantially box shape opened downward. Upper case 21 may be made of a metal material. Further, upper case 21 may be made of a resin material for weight reduction.

Figure 5:
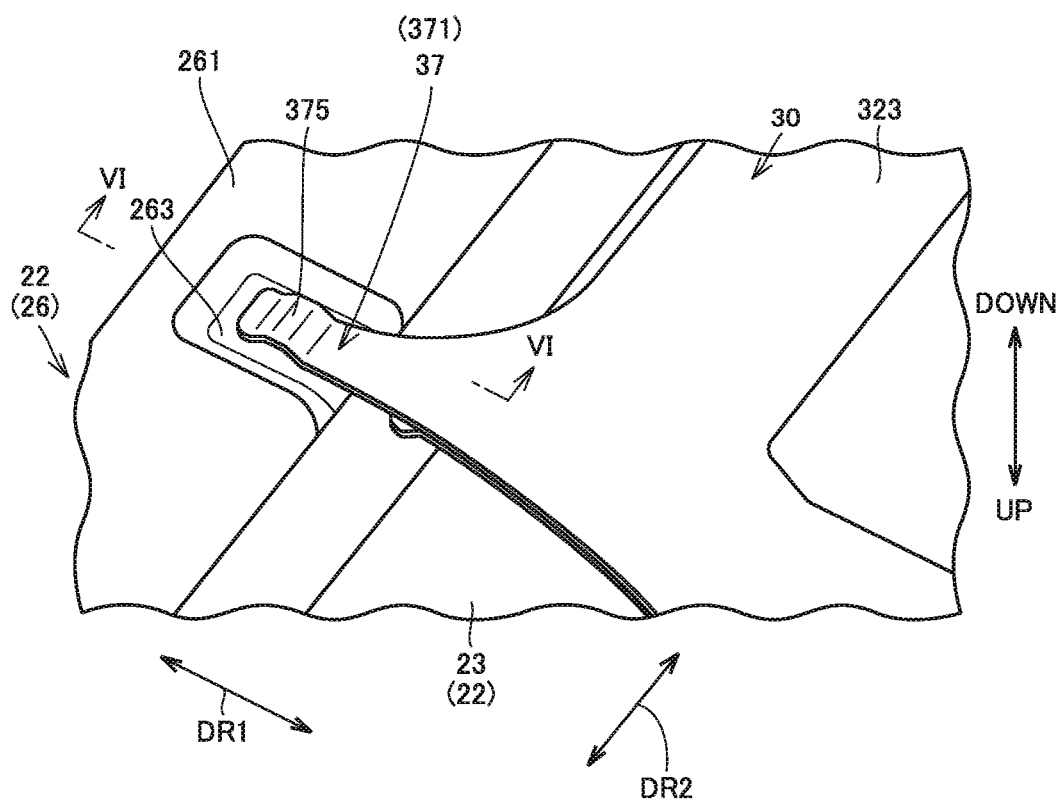
FIG. 5 is a view for illustrating a manner of fixing a projecting piece portion of the cooler in accordance with the embodiment.

Lower case 22 includes a main body portion 23, a plurality of bracket portions 25, and a pair of frame portions 26 (see FIG. 5). It should be noted that frame portions 26 are omitted in FIG. 1 for the sake of convenience.

Main body portion 23 has a substantially box shape opened upward. Main body portion 23 is made of a metal material such as iron. Main body portion 23 has a bottom wall portion 24. Bottom wall portion 24, the plurality of bracket portions 25, and later-described bottom wall portions 261 (see FIG. 6) of the pair of frame portions 26 constitute a bottom portion of lower case 22.

The plurality of bracket portions 25 are disposed side by side to be spaced in the first direction. The plurality of bracket portions 25 are fixed to bottom wall portion 24. The plurality of bracket portions 25 are provided to project downward from bottom wall portion 24. The plurality of bracket portions 25 are each provided to enter a gap between cooling portions 31 adjacent to each other. Each of the plurality of bracket portions 25 is provided to cover a part of bottom wall portion 24. The plurality of bracket portions 25 are provided to extend along the second direction.

The pair of frame portions 26 are respectively attached to both end portions of main body portion 23 in the first direction. Frame portion 26 located on one side in the first direction is provided to cover an end portion of a second main surface 24b located on the one side, and a side wall portion of main body portion 23 located on the one side. Frame portion 26 located on the other side in the first direction is provided to cover an end portion of second main surface 24b located on the other side, and a side wall portion of main body portion 23 located on the other side.

Bottom wall portion 24 of main body portion 23 has a first main surface 24a and second main surface 24b opposite to each other. First main surface 24a constitutes an inner surface of the bottom portion of lower case 22. Second main surface 24b constitutes, together with outer surfaces of the plurality of bracket portions 25 and lower surfaces of bottom wall portions 261, an outer surface (a lower surface) of the bottom portion of lower case 22.

Cooler 30 is a device for cooling the plurality of power storage modules 10. A refrigerant flow path through which a refrigerant flows is provided inside cooler 30. The refrigerant flow path is connected to a refrigerant introducing portion 61 and a refrigerant discharging portion 62. The refrigerant introduced from refrigerant introducing portion 61 into the refrigerant flow path cools the plurality of power storage modules 10, and is discharged from refrigerant discharging portion 62.

Cooler 30 is disposed below bottom wall portion 24 of lower case 22. Cooler 30 cools the plurality of power storage modules 10 via the bottom portion (more specifically, bottom wall portion 24) of lower case 22. Cooler 30 includes a plurality of cooling portions 31 for cooling power storage modules 10, and force exerting portions described later. Cooler 30 is made of a metal material such as aluminum. The rigidity of cooler 30 is lower than the rigidity of lower case 22. It should be noted that a detailed structure of cooler 30 will be described later using FIG. 2.

Heat conduction member 40 is disposed between second main surface 24b of bottom wall portion 24 and cooler 30. Via heat conduction member 40, bottom wall portion 24, and inner heat conduction layer 60, the plurality of power storage modules 10 are cooled by cooler 30. Heat conduction member 40 also functions as an adhesion layer that adheres bottom wall portion 24 and cooler 30. As heat conduction member 40, for example, an adhesive containing a silicone-based resin, an acrylic-based resin, an epoxy resin, or the like can be adopted.

Share panel 50 is disposed to cover cooler 30 from a lower side. Share panel 50 protects cooler 30 and suppresses cooler 30 from being wetted by water. Share panel 50 is made of a metal material. Share panel 50 includes a cover panel.

Inner heat conduction layer 60 is disposed between each power storage module 10 and first main surface 24a. More specifically, inner heat conduction layer 60 is disposed between first and second power storage stacks 11 and 12 included in each power storage module 10 and first main surface 24a. Inner heat conduction layer 60 also functions as an adhesion layer, and adheres and fixes each power storage module 10 to bottom wall portion 24. Thereby, the plurality of power storage modules 10 are each brought into thermal contact with the inner surface (specifically, first main surface 24a) of the lower case, by inner heat conduction layer 60.

Inner heat conduction layer 60 is made of a resin member having heat conductivity. As inner heat conduction layer 60, for example, an adhesive containing a silicone-based resin, an acrylic-based resin, an urethane resin, an epoxy resin, or the like can be adopted.

Figure 2:
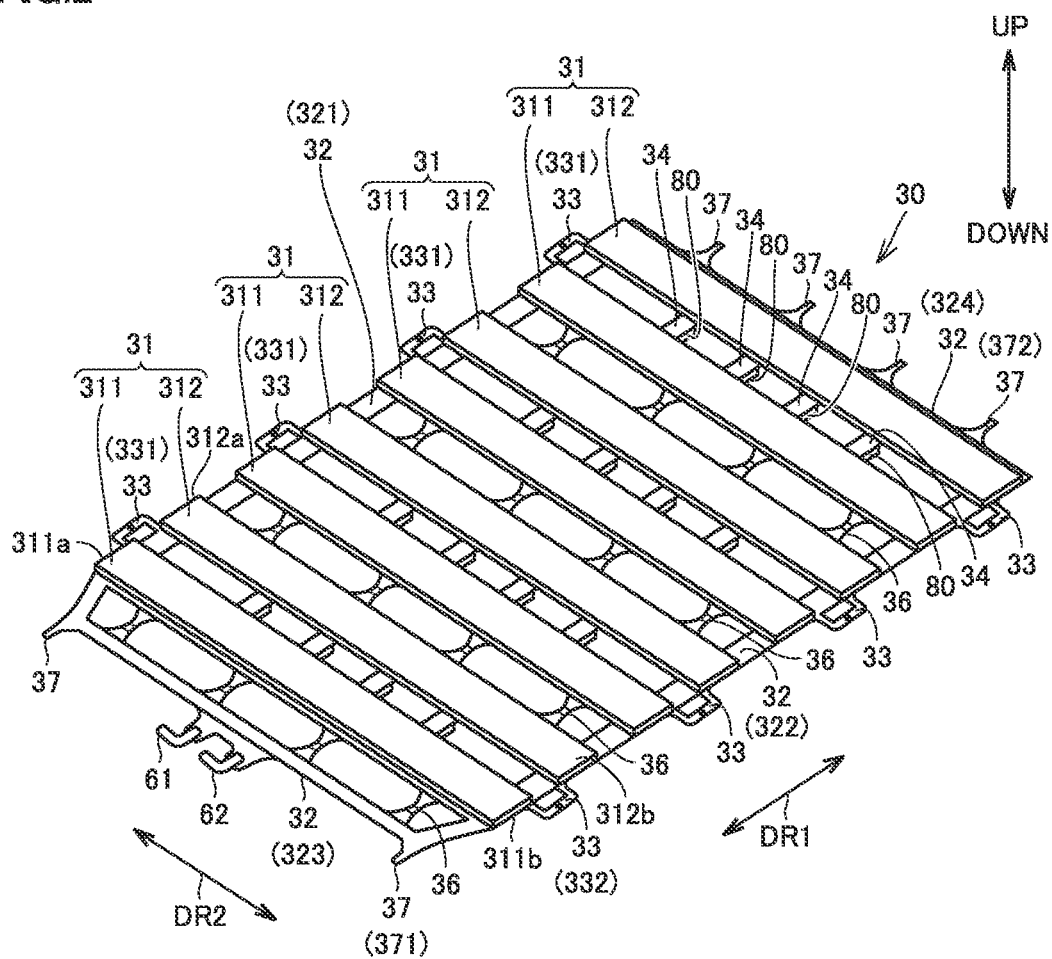
FIG. 2 is a perspective view of a cooler in accordance with the embodiment.

FIG. 2 is a perspective view of the cooler in accordance with the embodiment. Referring to FIG. 2, a configuration of cooler 30 will be described.

As shown in FIG. 2, cooler 30 includes the plurality of cooling portions 31, a holding portion 32, a plurality of fastening piece portions 33, a plurality of connecting piece portions 34, a plurality of reinforcing piece portions 36, and a plurality of projecting piece portions 37. Each of the plurality of fastening piece portions 33, the plurality of connecting piece portions 34, the plurality of reinforcing piece portions 36, and the plurality of projecting piece portions 37 functions as a force exerting portion.

The plurality of cooling portions 31 are disposed side by side to be spaced in the first direction. The plurality of cooling portions 31 are disposed at positions corresponding to the plurality of power storage modules 10. Each of the plurality of cooling portions 31 includes a first module cooling portion 311 and a second module cooling portion 312.

First module cooling portion 311 is disposed below the bottom portion (more specifically, bottom wall portion 24) of lower case 22 to sandwich the bottom portion between first module cooling portion 311 and first power storage stack 11. First module cooling portion 311 extends along the second direction. First module cooling portion 311 has a first end portion 311a and a second end portion 311b in the second direction.

Second module cooling portion 312 is disposed below the bottom portion (more specifically, bottom wall portion 24) of lower case 22 to sandwich the bottom portion between second module cooling portion 312 and second power storage stack 12. Second module cooling portion 312 extends along the second direction. Second module cooling portion 312 has a first end portion 312a and a second end portion 312b in the second direction.

Holding portion 32 holds the plurality of cooling portions 31. Holding portion 32 has a first holding portion 321 and a second holding portion 322, and a front portion 323 and a rear portion 324.

First holding portion 321 extends along the first direction. In each of cooling portions 31, first holding portion 321 holds first end portion 311a of first module cooling portion 311 and first end portion 312a of second module cooling portion 312.

Second holding portion 322 is disposed to be spaced from first holding portion 321 in the second direction. Second holding portion 322 extends along the first direction. In each of cooling portions 31, second holding portion 322 holds second end portion 311b of first module cooling portion 311 and second end portion 312b of second module cooling portion 312.

Front portion 323 and rear portion 324 constitute both end portions of cooler 30 in DR1 direction.

Front portion 323 is located on one side of cooler 30 in the first direction. Front portion 323 is provided to connect first holding portion 321 and second holding portion 322 on the one side in the first direction. Front portion 323 is provided to project from one end of each of first holding portion 321 and second holding portion 322 in the first direction, toward the one side in the first direction. Front portion 323 has a substantially C shape. Front portion 323 is provided with refrigerant introducing portion 61 and refrigerant discharging portion 62.

Rear portion 324 is located on the other side of cooler 30 in the first direction. Rear portion 324 is provided to connect first holding portion 321 and second holding portion 322 on the other side in the first direction. Rear portion 324 extends along the second direction.

The plurality of fastening piece portions 33 are provided to project outward from holding portion 32. Specifically, the plurality of fastening piece portions 33 project from holding portion 32 outward in the second direction. The plurality of fastening piece portions 33 are provided to be spaced in the first direction. The plurality of fastening piece portions 33 are provided in each of first holding portion 321 and second holding portion 322.

The plurality of fastening piece portions 33 include a plurality of first fastening piece portions 331 provided in first holding portion 321, and a plurality of second fastening piece portions 332 provided in second holding portion 322.

Each of the plurality of first fastening piece portions 331 projects from first holding portion 321 at a portion located between first module cooling portion 311 and second module cooling portion 312 in the first direction, outward in the second direction.

Each of the plurality of second fastening piece portions 332 projects from second holding portion 322 at a portion located between first module cooling portion 311 and second module cooling portion 312 in the first direction, outward in the second direction.

The plurality of connecting piece portions 34 are provided to connect first module cooling portion 311 and second module cooling portion 312 in each cooling portion 31. The plurality of connecting piece portions 34 are disposed to be spaced in the second direction. A damper member 80 is provided on a back surface of each connecting piece portion 34.

The plurality of reinforcing piece portions 36 are provided to connect cooling portions 31 adjacent to each other. The plurality of reinforcing piece portions 36 are disposed to be spaced in the second direction, between cooling portions 31 adjacent to each other. Reinforcing piece portions 36 located on both end sides in the second direction, between cooling portions 31 adjacent to each other, are located more outward in the second direction, than the plurality of connecting piece portions 34. Between cooling portions 31 adjacent to each other, the spacing between the plurality of reinforcing piece portions 36 in the second direction is larger than the spacing between the plurality of connecting piece portions 34 in the second direction.

The plurality of projecting piece portions 37 are provided to project outward from holding portion 32. The plurality of projecting piece portions 37 project in a direction different from the direction in which the plurality of fastening piece portions 33 project. The plurality of projecting piece portions 37 project outward in the first direction.

The plurality of projecting piece portions 37 include first projecting piece portions 371 projecting from front portion 323 toward the one side in the first direction, and second projecting piece portions 372 projecting from rear portion 324 toward the other side in the first direction.

Figure 3:
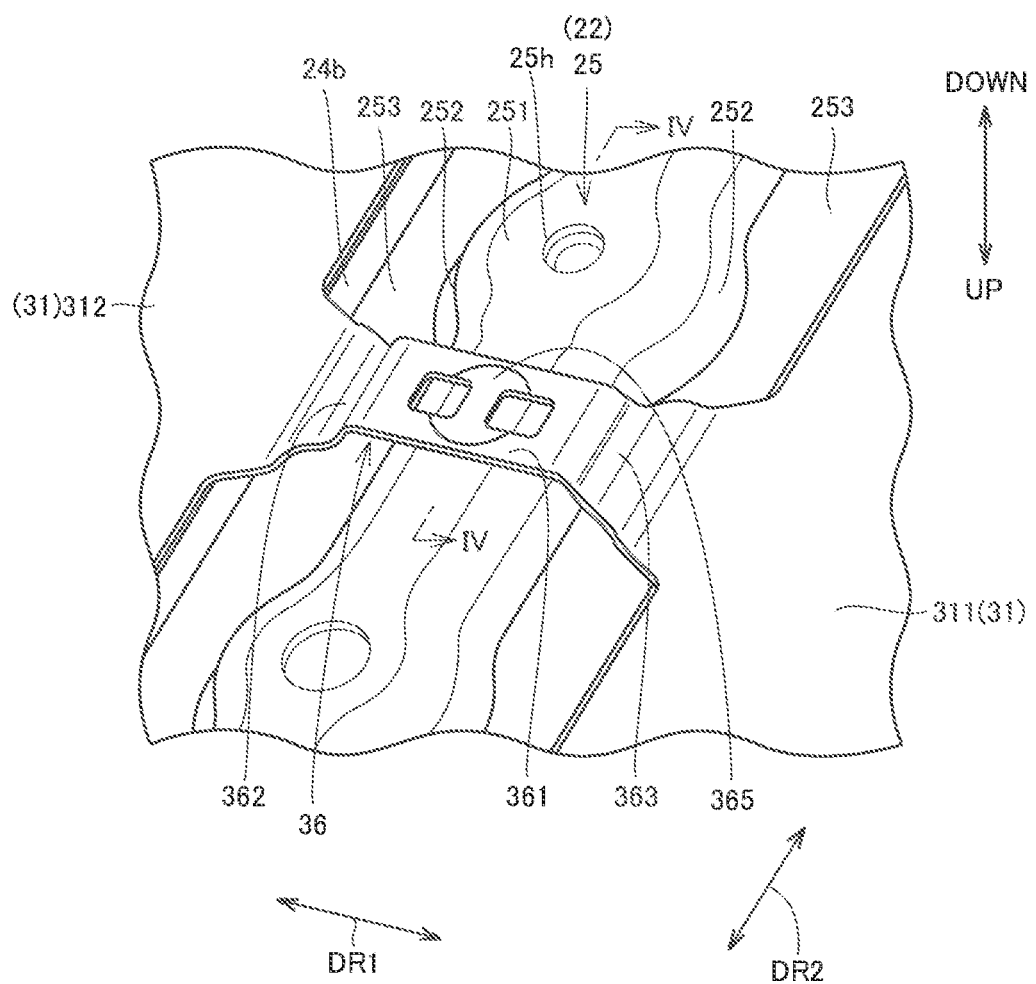
FIG. 3 is a view for illustrating a manner of fixing a reinforcing piece portion of the cooler in accordance with the embodiment.
Figure 4:
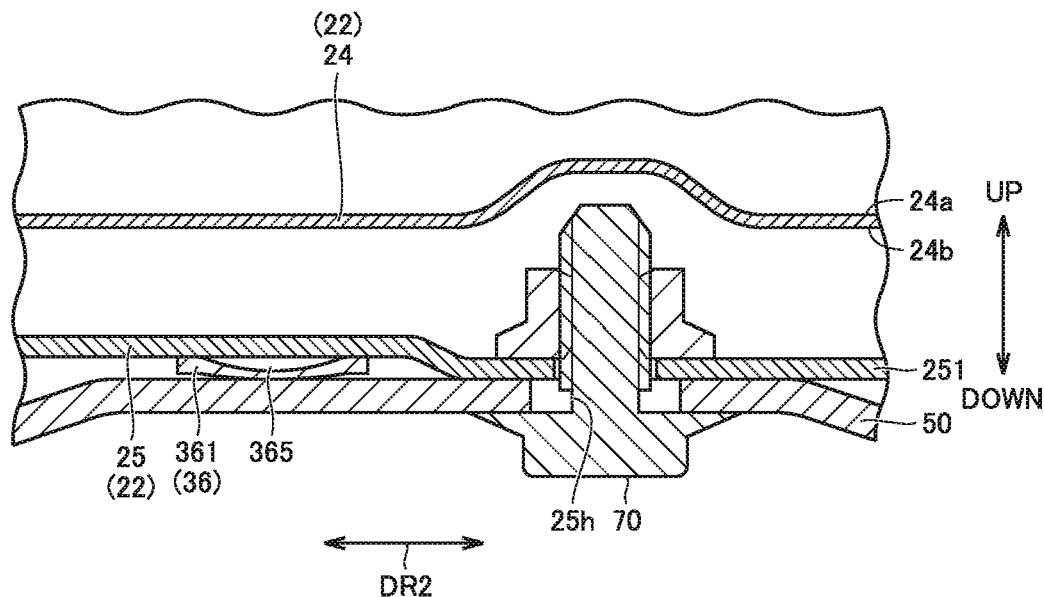
FIG. 4 is a cross sectional view taken along a line IV-IV shown in FIG. 3.

FIG. 3 is a view for illustrating a manner of fixing a reinforcing piece portion of the cooler in accordance with the embodiment. It should be noted that share panel 50 is omitted in FIG. 3 for the sake of convenience, and FIG. 3 shows a view obtained when cooler 30 and lower case 22 are seen from a bottom surface side of lower case 22. In FIG. 3, the up-down direction is reversed. FIG. 4 is a cross sectional view taken along a line IV-IV shown in FIG. 3. Referring to FIGS. 3 and 4, the manner of fixing reinforcing piece portion 36 will be described.

As shown in FIG. 3, bracket portion 25 has a bottom plate portion 251, a pair of side wall portions 252, and a pair of flange portions 253. Bottom plate portion 251 constitutes a bottom portion of bracket portion 25. Holes 25h are provided in bottom plate portion 251.

The pair of side wall portions 252 are provided to rise from both ends of bottom plate portion 251 in the first direction. The pair of flange portions 253 are connected to end portions of the pair of side wall portions 252 located on sides opposite to sides on which bottom plate portion 251 is located. The pair of flange portions 253 are provided to be substantially parallel to second main surface 24b of bottom wall portion 24. The pair of flange portions 253 are fixed to second main surface 24b by welding or the like.

Reinforcing piece portion 36 is provided to straddle bracket portion 25. Reinforcing piece portion 36 has a plate-shaped portion 361, a first connecting portion 362, and a second connecting portion 363.

Plate-shaped portion 361 extends along the first direction. Plate-shaped portion 361 contacts bottom plate portion 251. Plate-shaped portion 361 is provided with a bulging portion 365 having a dome shape. Bulging portion 365 bulges toward a side opposite to a side on which the bottom portion of lower case 22 is located (i.e., bulges downward). That is, bulging portion 365 bulges toward share panel 50.

First connecting portion 362 connects an end portion of plate-shaped portion 361 located on the one side in the first direction, to cooling portion 31 located on the one side in the first direction, of cooling portions 31 adjacent to each other. First connecting portion 362 is provided to extend downward as it approaches plate-shaped portion 361.

Second connecting portion 363 connects an end portion of plate-shaped portion 361 located on the other side in the first direction, to cooling portion 31 located on the other side in the first direction, of cooling portions 31 adjacent to each other. Second connecting portion 363 is provided to extend downward as it approaches plate-shaped portion 361.

As shown in FIG. 4, share panel 50 is fastened and fixed to bracket portion 25 with a fastening member 70 being inserted in hole 25h, and reinforcing piece portion 36 (more specifically, plate-shaped portion 361) is sandwiched between the bottom portion of lower case 22 and share panel 50.

In a state where reinforcing piece portion 36 is sandwiched, bulging portion 365 is sandwiched between bottom plate portion 251 and share panel 50, and thereby bulging portion 365 is elastically deformed and exerts an elastic force. A reaction force caused by the elastic force acts on cooler 30, and cooler 30 is pressed toward the bottom portion of lower case 22. Thus, reinforcing piece portion 36 functions as the force exerting portion described above, and can bring cooler 30 into close contact with the lower surface of lower case 22 so as to conform thereto.

Figure 6:
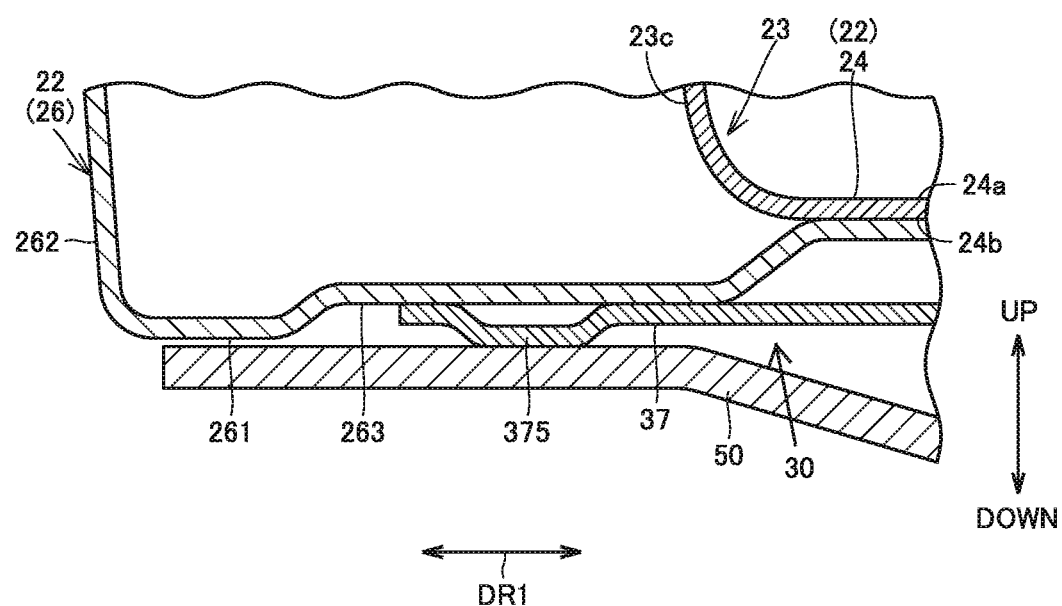
FIG. 6 is a cross sectional view taken along a line VI-VI shown in FIG. 5.

FIG. 5 is a view for illustrating a manner of fixing a projecting piece portion of the cooler in accordance with the embodiment. It should be noted that share panel 50 is omitted in FIG. 5 for the sake of convenience, and FIG. 5 shows a view obtained when cooler 30 and lower case 22 are seen from the bottom surface side of lower case 22. In FIG. 5, the up-down direction is reversed. FIG. 6 is a cross sectional view taken along a line VI-VI shown in FIG. 5. Referring to FIGS. 5 and 6, the manner of fixing projecting piece portion 37 will be described.

FIGS. 5 and 6 show the manner of fixing projecting piece portion 37 (first projecting piece portion 371) provided in front portion 323. It should be noted that the manner of fixing projecting piece portion 37 (second projecting piece portion 372) provided in rear portion 324 is substantially the same as the manner of fixing projecting piece portion 37 provided in front portion 323, and thus the description thereof is not repeated here.

Frame portion 26 shown in FIGS. 5 and 6 is assembled to an end portion of main body portion 23 on the one side in the first direction, and has bottom wall portion 261 and a side wall portion 262. Bottom wall portion 261 is provided to abut on second main surface 24*b* at a portion located on the one side in the first direction, and project from main body portion 23 toward the one side in the first direction. Bottom wall portion 261 is provided with a mounting portion 263 on which a tip of projecting piece portion 37 is mounted. Mounting portion 263 is provided to be recessed upward.

Side wall portion 262 is connected to an end portion of bottom wall portion 261 located on the one side in the first direction. Side wall portion 262 is provided to face a side wall portion 23*c* of main body portion 23.

A bulging portion 375 is provided at the tip of projecting piece portion 37. Bulging portion 375 bulges toward the side opposite to the side on which the bottom portion of lower case 22 is located (i.e., bulges downward). That is, bulging portion 375 bulges toward share panel 50.

Here, the tip of projecting piece portion 37 is sandwiched between the bottom portion (more specifically, bottom wall portion 261) of lower case 22 and share panel 50. In this state, bulging portion 375 is sandwiched between bottom wall portion 261 and share panel 50, and thereby bulging portion 375 is elastically deformed and exerts an elastic force. A reaction force caused by the elastic force acts on cooler 30, and cooler 30 is pressed toward the bottom portion of lower case 22. Thus, projecting piece portion 37 functions as the force exerting portion described above, and can bring cooler 30 into close contact with the lower surface of lower case 22 so as to conform thereto.

Figure 7:
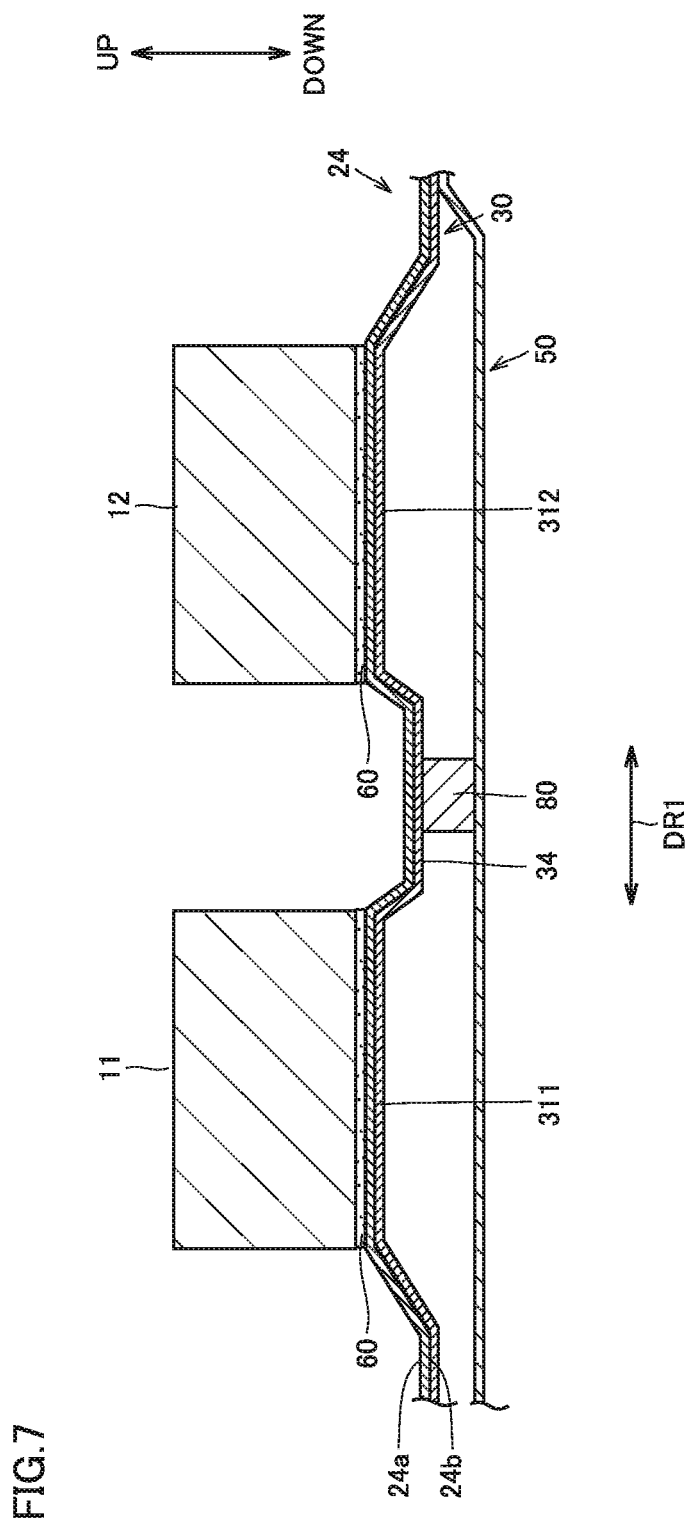
FIG. 7 is a cross sectional view showing a manner of placing a damper member in the cooler in accordance with the embodiment.

FIG. 7 is a cross sectional view showing a manner of placing a damper member in the cooler in accordance with the embodiment. It should be noted that heat conduction member 40 is omitted in FIG. 7 for the sake of convenience. Referring to FIG. 7, the manner of placing damper member 80 in accordance with the embodiment will be described.

As shown in FIG. 7, damper member 80 is sandwiched between connecting piece portion 34 and share panel 50. Thereby, damper member 80 is subjected to compression deformation, and a reaction force based on the deformation acts on cooler 30. This can bring cooler 30 into closer contact toward the bottom surface side of lower case 22.

Figure 8:
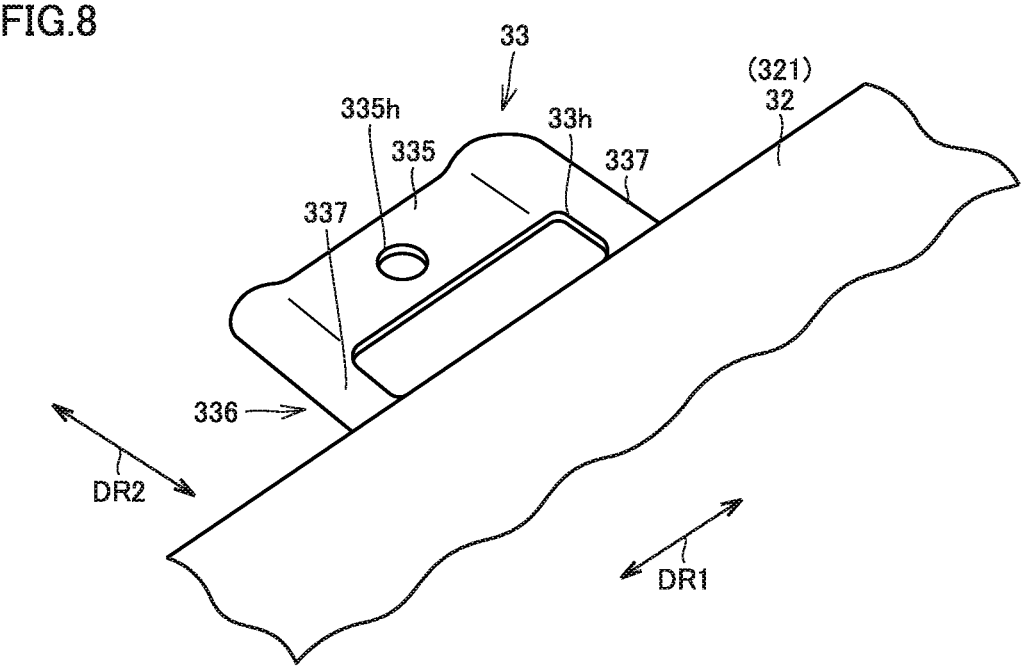
FIG. 8 is a perspective view showing a fastening piece portion of the cooler in accordance with the embodiment.

FIG. 8 is a perspective view showing a fastening piece portion of the cooler in accordance with the embodiment. Referring to FIG. 8, a detailed structure of fastening piece portion 33 will be described.

As shown in FIG. 8, fastening piece portion 33 includes a tip portion 335, and a root portion 336 connected to holding portion 32. Root portion 336 is provided with a notch portion 33*h*. By providing notch portion 33*h*, a gap is formed between tip portion 335 and holding portion 32. Further, a pair of supporting portions 337 for supporting tip portion 335 are formed on both outer sides of notch portion 33*h* in the first direction, in root portion 336. The pair of supporting portions 337 are disposed side by side to be spaced in the first direction, and extend along the second direction.

A fastening hole 335*h* is provided at a central portion of tip portion 335. By inserting a fastening member into fastening hole 335*h*, fastening piece portion 33 is fastened to the bottom portion of lower case 22. On this occasion, by providing notch portion 33*h*, root portion 336 (more specifically, the pair of supporting portions 337) is deformed and acts as a spring structure, and cooler 30 is pressed toward the bottom portion of lower case 22. Thus, fastening piece portion 33 functions as the force exerting portion described above, and can bring cooler 30 into close contact with the lower surface of lower case 22 so as to conform thereto.

Further, by providing first fastening piece portion 331 and second fastening piece portion 332 between first module cooling portion 311 and second module cooling portion 312 in the first direction as described above, the action of first fastening piece portion 331 and second fastening piece portion 332 as spring structures can be enhanced. Furthermore, when compared with a configuration in which fastening piece portions are provided on both sides of each module cooling portion, the number of fastening piece portions can be reduced, which can reduce the weight of cooler 30 and thereby the weight of power storage device 1.

Other Variations

Although the embodiment described above illustrates the case where power storage module 10 includes two power storage stacks, the number of power storage stacks is not limited thereto, and may be one, or may be three or more.

Although the embodiment described above illustrates the case where the force exerting portions include fastening piece portion 33, reinforcing piece portion 36, projecting piece portion 37, and damper member 80, the force exerting portions only need to include any of fastening piece portion 33, reinforcing piece portion 36, projecting piece portion 37, and damper member 80. That is, it is satisfactory as long as any of fastening piece portion 33, reinforcing piece portion 36, projecting piece portion 37, and damper member 80 is provided. When fastening piece portion 33, reinforcing piece portion 36, projecting piece portion 37, and damper member 80 are all provided, cooler 30 can be more effectively brought into close contact with the bottom portion of lower case 22 so as to conform thereto.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. A power storage device comprising:
   a lower case having a bottom portion including an inner surface and an outer surface;
   one or more power storage modules thermally connected to the inner surface of the bottom portion; and
   a cooler that is provided on a side of the outer surface of the bottom portion and cools the one or more power storage modules via the bottom portion, the cooler being made of a member having a rigidity lower than that of the lower case, the cooler including a force exerting portion that exerts a force toward the bottom portion, wherein the cooler includes one or more cooling portions that cool the one or more power storage modules, a holding portion that holds the one or more cooling portions, and a fastening piece portion that projects outward from the holding portion and is fastened to the outer surface of the bottom portion, wherein the fastening piece portion includes a root portion connected to the holding portion, and the root portion is provided with a notch portion, wherein the force exerting portion is constituted by the fastening piece portion, each of the one or more power storage modules includes a first power storage stack and a second power storage stack disposed side by side in a first direction, wherein each of the first power storage stack and the second power storage stack includes a plurality of power storage cells arranged in a second direction crossing the first direction, wherein each of the one or more cooling portions includes a first module cooling portion disposed below the bottom portion to sandwich the bottom portion between the first module cooling portion and the first power storage stack, and a second module cooling portion disposed below the bottom portion to sandwich the bottom portion between the second module cooling portion and the second power storage stack, wherein each of the first module cooling portion and the second module cooling portion extends along the second direction and has a first end portion and a second end portion in the second direction, wherein the holding portion includes a first holding portion that extends along the first direction and holds the first end portions of the first module cooling portion and the second module cooling portion, and a second holding portion that extends along the first direction and holds the second end portions of the first module cooling portion and the second module cooling portion, and wherein the fastening piece portion includes a first fastening piece portion that projects from the first holding portion at a portion located between the first module cooling portion and the second module cooling portion in the first direction, outward along the second direction, and a second fastening piece portion that projects from the second holding portion at a portion located between the first module cooling portion and the second module cooling portion in the first direction, outward along the second direction.

2. The power storage device according to claim 1, further comprising:

a panel that covers the cooler from a lower side of the cooler; and a damper member, wherein each of the one or more power storage modules includes a first power storage stack and a second power storage stack disposed side by side in a first direction, the cooler includes a first module cooling portion disposed below the bottom portion to sandwich the bottom portion between the first module cooling portion and the first power storage stack, and a second module cooling portion disposed below the bottom portion to sandwich the bottom portion between the second module cooling portion and the second power storage stack, the cooler includes a connecting piece portion that connects the first module cooling portion and the second module cooling portion, the damper member is provided to be sandwiched between the connecting piece portion and the panel, and the force exerting portion is constituted by the damper member.

3. The power storage device according to claim 1, further comprising a panel that covers the cooler from a lower side of the cooler, wherein the one or more power storage modules include a plurality of power storage modules disposed side by side in a first direction, the cooler includes a plurality of cooling portions disposed side by side to be spaced in the first direction to correspond to the plurality of power storage modules, the cooler includes a reinforcing piece portion that connects the cooling portions adjacent to each other, the reinforcing piece portion is provided to be sandwiched between the bottom portion and the panel, and the force exerting portion is constituted by the reinforcing piece portion.

4. The power storage device according to claim 1, further comprising a panel that covers the cooler from a lower side of the cooler, wherein the cooler includes one or more cooling portions that cool the one or more power storage modules, a holding portion that holds the one or more cooling portions, and a projecting piece portion that projects outward from the holding portion, the projecting piece portion is provided to be sandwiched between the bottom portion and the panel, and the force exerting portion is constituted by the projecting piece portion.

5. A power storage device comprising:

a lower case having a bottom portion including an inner surface and an outer surface;

one or more power storage modules thermally connected to the inner surface of the bottom portion;

a cooler that is provided on a side of the outer surface of the bottom portion and cools the one or more power storage modules via the bottom portion, the cooler being made of a member having a rigidity lower than that of the lower case, the cooler including a force exerting portion that exerts a force toward the bottom portion;

a panel that covers the cooler from a lower side of the cooler; and a damper member, wherein each of the one or more power storage modules includes a first power storage stack and a second power storage stack disposed side by side in a first direction, wherein the cooler includes a first module cooling portion disposed below the bottom portion to sandwich the bottom portion between the first module cooling portion and the first power storage stack, and a second module cooling portion disposed below the bottom portion to sandwich the bottom portion between the second module cooling portion and the second power storage stack, wherein the cooler includes a connecting piece portion that connects the first module cooling portion and the second module cooling portion, wherein the damper member is provided to be sandwiched between the connecting piece portion and the panel, and wherein the force exerting portion is constituted by the damper member.

6. A power storage device comprising:
a lower case having a bottom portion including an inner surface and an outer surface;
one or more power storage modules thermally connected to the inner surface of the bottom portion;
a cooler that is provided on a side of the outer surface of the bottom portion and cools the one or more power storage modules via the bottom portion, the cooler being made of a member having a rigidity lower than that of the lower case, the cooler including a force exerting portion that exerts a force toward the bottom portion; and
a panel that covers the cooler from a lower side of the cooler,
wherein the one or more power storage modules include a plurality of power storage modules disposed side by side in a first direction,
wherein the cooler includes a plurality of cooling portions disposed side by side to be spaced in the first direction to correspond to the plurality of power storage modules,
wherein the cooler includes a reinforcing piece portion that connects the cooling portions adjacent to each other,
wherein the reinforcing piece portion is provided to be sandwiched between the bottom portion and the panel, and
wherein the force exerting portion is constituted by the reinforcing piece portion.

* * * * *